United States Patent [19]

Masel et al.

[11] Patent Number: 5,575,196

[45] Date of Patent: Nov. 19, 1996

[54] GRILLING APPLIANCE

[75] Inventors: Reuben Masel, Ramat Hasharon; George Valdshtein, Ganey Tiqva, both of Israel

[73] Assignee: Applicon Ltd., Hod Hasharon, Israel

[21] Appl. No.: 503,009

[22] Filed: Jul. 17, 1995

[51] Int. Cl.[6] .............................. A47J 37/00; A47J 37/04
[52] U.S. Cl. ...................... 99/421 V; 99/419; 99/421 R; 99/448
[58] Field of Search ................ 99/339, 340, 419–421 V, 99/443, 446, 447, 448, 450; 126/59, 59.5, 41 A, 41 R, 25 R, 276

[56] References Cited

U.S. PATENT DOCUMENTS

| | | |
|---|---|---|
| 1,896,537 | 2/1933 | Bonaccorsi . |
| 1,929,166 | 10/1933 | Freemon . |
| 2,537,378 | 1/1951 | Staltare .................................. 99/421 V |
| 2,581,570 | 1/1952 | Amanatides ........................... 99/421 V |
| 2,632,379 | 3/1953 | Kudo . |
| 2,687,080 | 8/1954 | Dorin ..................................... 99/421 V |
| 3,746,837 | 7/1973 | Frey et al. . |
| 3,824,916 | 7/1974 | Green et al. . |
| 3,938,431 | 2/1976 | Potvin . |
| 3,956,979 | 5/1976 | Coroneos .................................. 99/446 |
| 4,762,058 | 8/1988 | Masel et al. . |
| 5,101,715 | 4/1992 | Liu ........................................... 99/419 |
| 5,181,455 | 1/1993 | Masel et al. . |

*Primary Examiner*—Timothy F. Simone
*Attorney, Agent, or Firm*—Ladas & Parry

[57] ABSTRACT

A grilling appliance, includes a vertical impaling member of thermally-conductive material mounted vertically within a grilling compartment for impaling a food article to be grilled; a rotary drive for rotating the vertical impaling member about a vertical axis; a heater located within the vertical impaling member for heating the interior of the food article to be grilled; and a heater located laterally of the vertical impaling member for heating the exterior of the food article to be grilled.

24 Claims, 7 Drawing Sheets

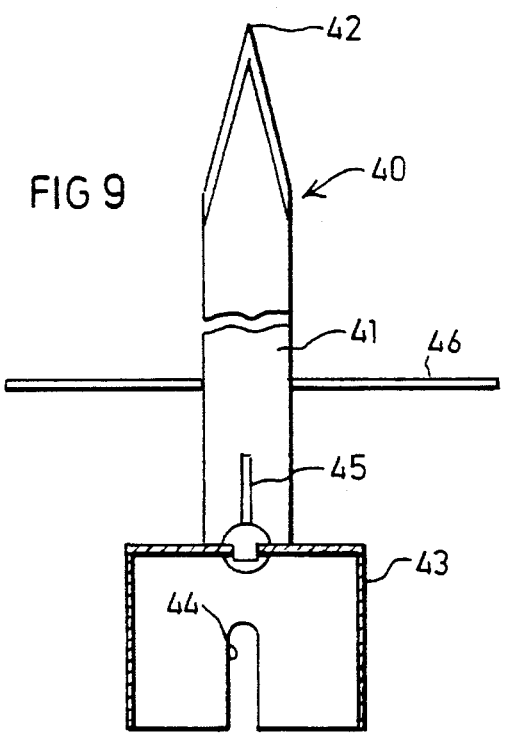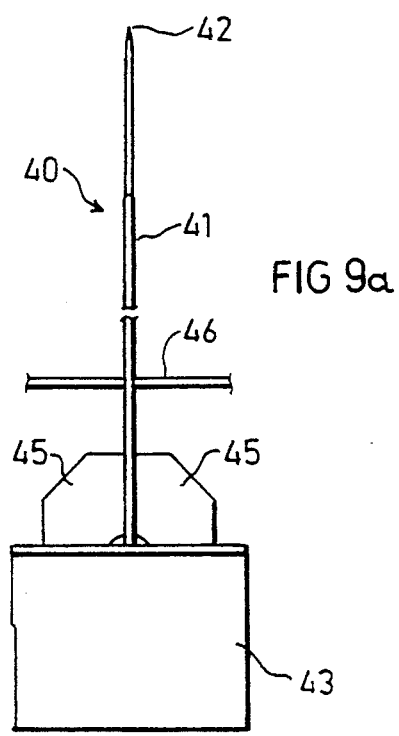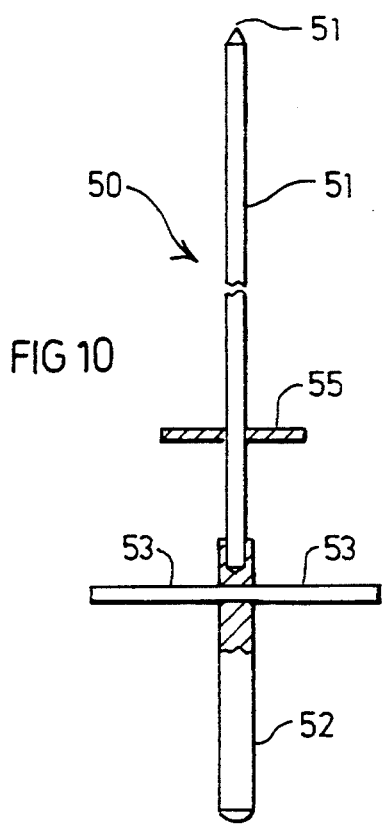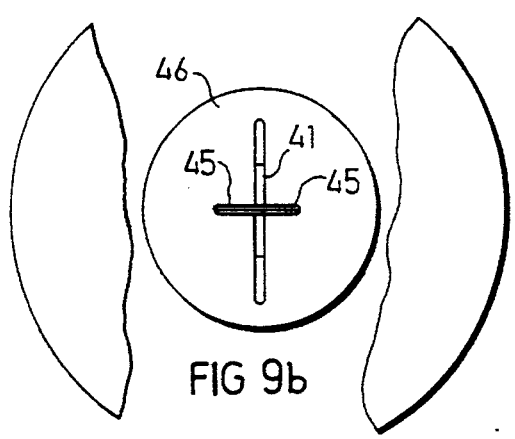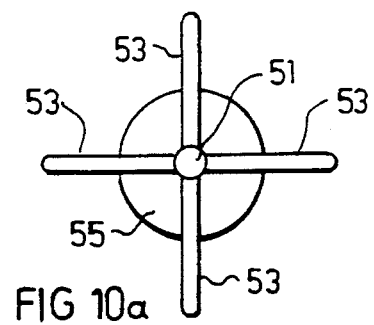

GRILLING APPLIANCE

FIELD AND BACKGROUND OF THE INVENTION

The present invention relates to a grilling appliance for grilling food articles, particularly various kinds of meat articles.

Many different types of electrical grilling appliances are known for grilling or roasting meat or other food articles. Such appliances usually require a considerable period of time for properly grilling the food articles because of poor penetration of heat when applied from the outside of the food article. In addition, the known appliances are generally designed for one particular kind of food article, and are therefore not suitable for different kinds of food articles.

OBJECTS AND BRIEF SUMMARY OF THE INVENTION

An object of the present invention is to provide an electrical grilling appliance which is capable of grilling food articles in a relatively short period of time. Another object of the invention is to provide an electrical grilling appliance which may be used for grilling a large variety of meat products and other kinds of food articles.

According to a broad aspect of the present invention, there is provided a grilling appliance, comprising: a housing defining a grilling compartment for receiving food articles to be grilled; a vertical impaling member of thermally-conductive material mounted vertically within the grilling compartment for impaling a food article to be grilled; a rotary drive for rotating the vertical impaling member about a vertical axis; a first heater located within the vertical impaling member for heating the interior of the food article to be grilled; and a second heater located laterally of the vertical impaling member for heating the exterior of the food article to be grilled.

According to further features in the described preferred embodiment, the rotary drive is enclosed within a base underlying the grilling compartment, and a horizontal pan is rotatably supported on the base. The first heater is an electrical heater fixed to the base and passing through the center of the pan; the second heater is also an electrical heater and is fixed to the base laterally of the pan. The pan is formed with a central vertical hub having a connector for removably attaching the vertical impaling member thereto.

According to further features in the described preferred embodiment, the appliance includes a number of accessories attachable to the central vertical hub of the horizontal pan in place of the vertical impaling member. The described accessories include a sword-type impaling member, and a flat food holder, each attachable in a vertical position to the central vertical hub in place of the vertical impaling member and the first electrical heater.

According to still furthers in the described preferred embodiment, the pan is formed with at least one or more vertical sockets for receiving a vertical skewer rod. Each vertical skewer rod is rotatably received within its respective socket and includes a plurality of projections around its periphery engageable with a projection fixed to the housing for imparting a partial rotation of the vertical skewer rod in its socket during each complete rotation of the pan.

As will be described more particularly below, a grilling appliance constructed in accordance with the foregoing features is capable of grilling a wide variety of different kinds of food articles in a relatively short period of time.

Further features and advantages of the invention will be apparent from the description below.

BRIEF DESCRIPTION OF THE DRAWINGS

The invention is herein described, by way of example only, with reference to the accompanying drawings, wherein:

FIG. 9 is a side elevational view, partly in section, illustrating a sword-type impaling member which may be included among the accessories;

FIGS. 9a and 9b are an end elevational view, and a top plan view, respectively, of the sword-type impaling member of FIG. 9;

FIG. 10 is a side elevational view, partly in section, illustrating a skewer rod which may be included among the accessories;

FIG. 10a is a top plan view of the skewer rod of FIG. 10;

DESCRIPTION OF A PREFERRED EMBODIMENT

Figure 2:
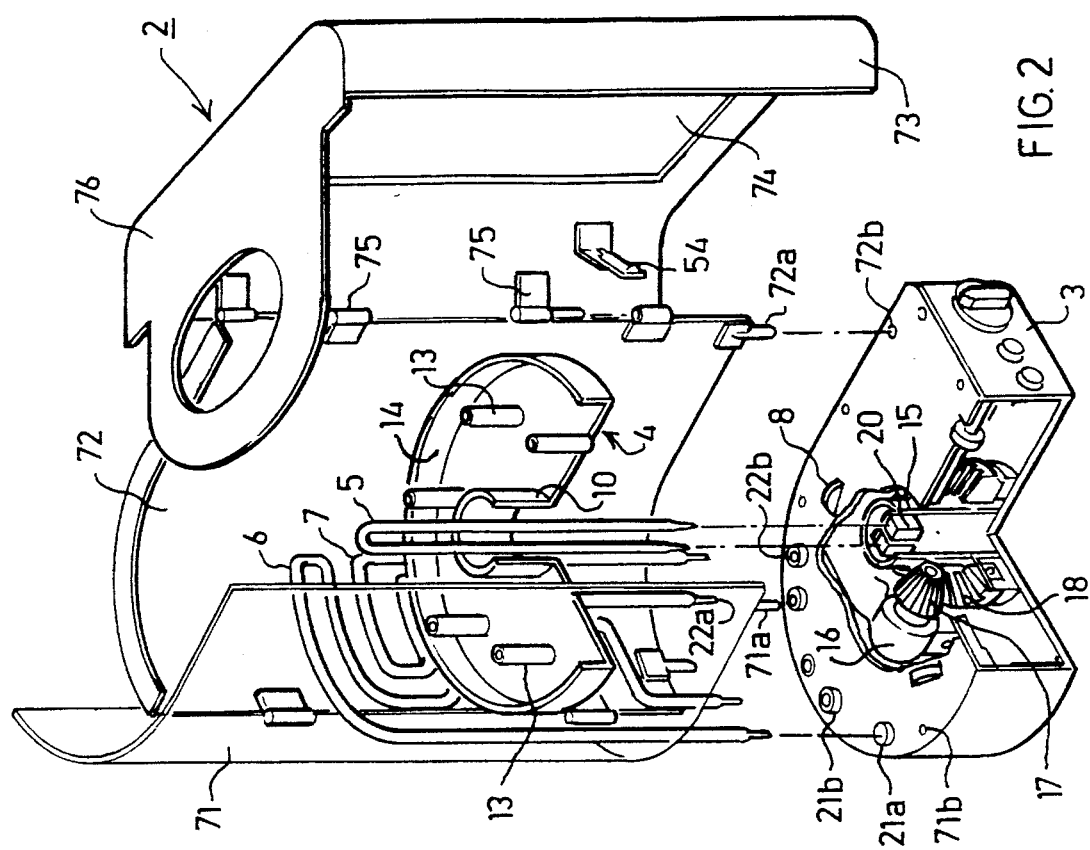
FIG. 2 is an exploded view, partly in section, illustrating the main elements of the grilling appliance of FIG. 1.
Figure 1:
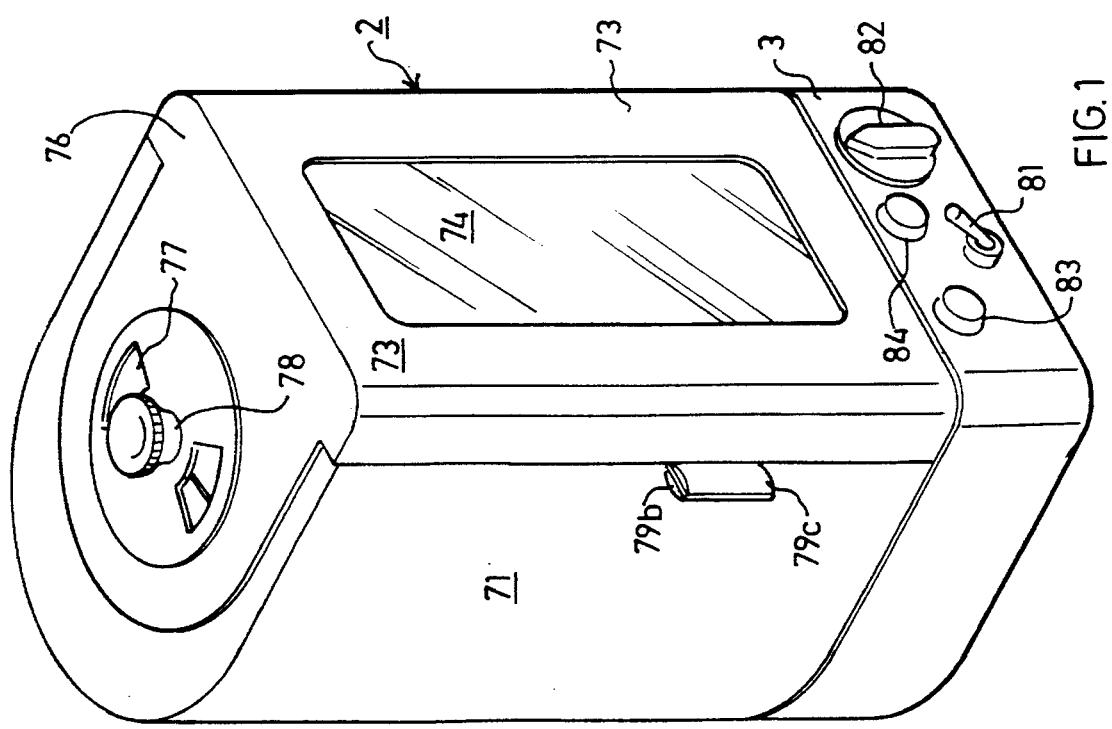
FIG. 1 pictorially illustrates one form of grilling appliance constructed in accordance with the present invention.

The grilling appliance illustrated in FIGS. 1 and 2 is particularly designed for home use to grill a wide variety of meat products and other kinds of food articles. It includes a housing 2 supported on a base 3. The housing 2 defines a grilling compartment for receiving the food articles to be grilled. The food articles are supported by a rotatable horizontal pan 4 and are heated by electrical heaters 5, 6 and 7.

Base 3 is constructed as a separate unit separable from housing 2 and includes a rotary drive for rotating horizontal pan 4. It also includes various controls for controlling the energization of the electrical heaters 5, 6 and 7. Base 3 rotatably supports horizontal pan 4 by a plurality of rollers 8 projecting through the upper surface of the base and engageable with the lower surface of the pan.

Figure 3:
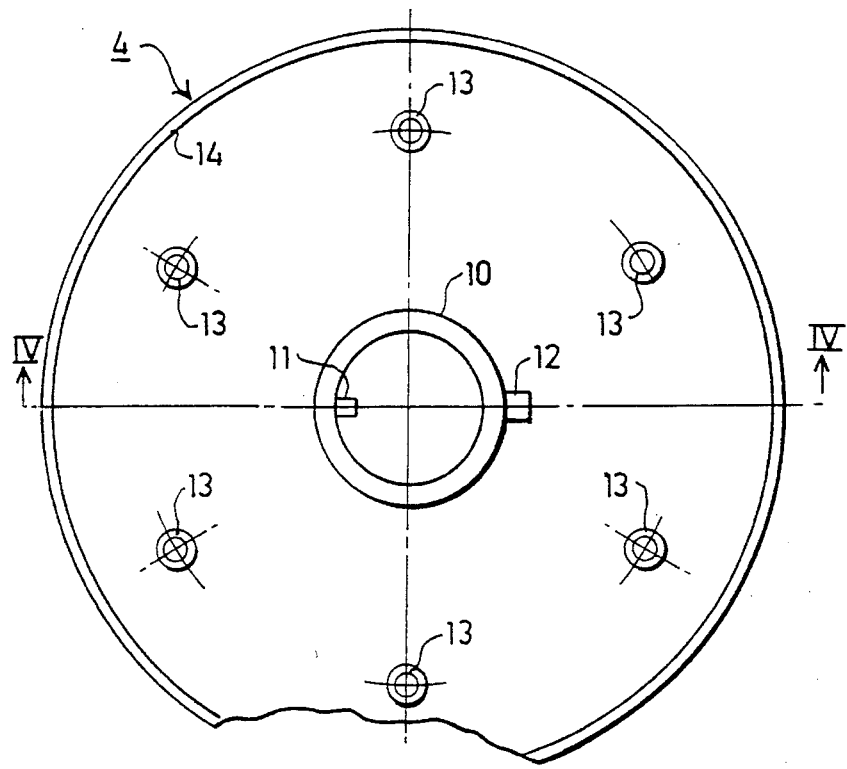
FIG. 3 is a top plan view of the horizontal pan in the grilling appliance of FIGS. 1 and 2.
Figure 5:
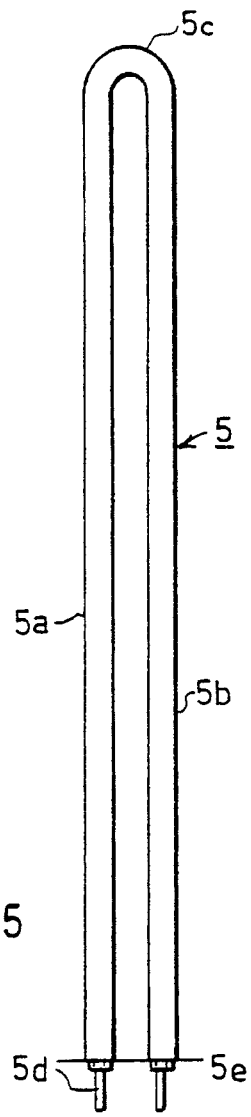
FIG. 5 is a side elevational view of the central electrical heater.
Figure 4:
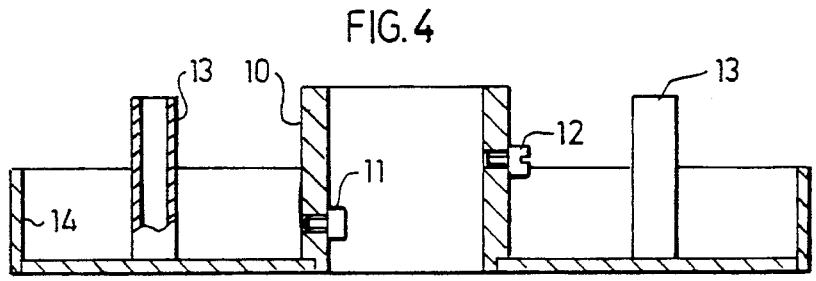
FIG. 4 is a sectional view along line IV—IV of FIG. 3.
Figure 6:
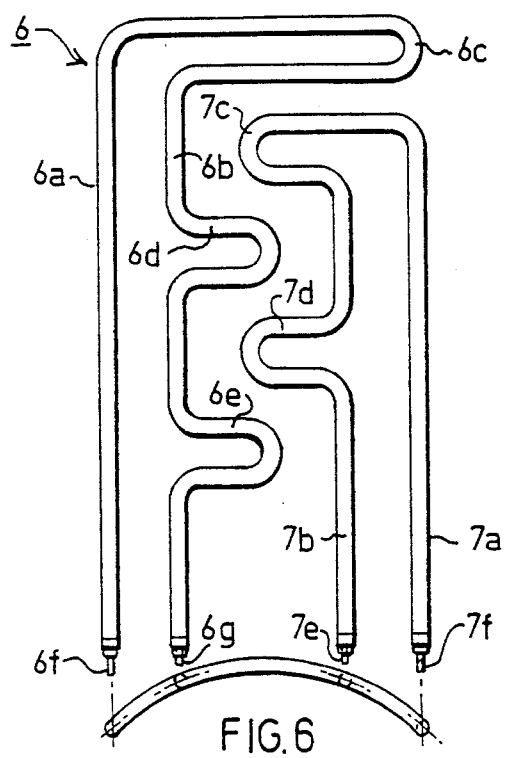
FIG. 6 is a side elevational view of the lateral electrical heaters.

Horizontal pan 4 is more particularly illustrated in FIGS. 3 and 4. It is formed with a central vertical hub 10 carrying an inner pin 11 and an outer pin 12. Inner pin 11 is used for coupling the pan to the rotatable drive within base 3; and outer pin 12 is used for attaching various accessories to the pan according to the type of food article to be grilled, as will be described more particularly below.

A plurality of vertical tubes 13 are secured, as by welding, to the upper surface of pan 4 spaced equally around its periphery. Each tube 13 serves as a vertical socket for receiving a skewer rod, one of the accessories to be used with the electrical appliance and more particularly illustrated in FIG. 10.

Pan 4 serves, in addition to mounting the various accessories for the different kinds of food articles to be grilled, also as a drip pan for catching the drippings from the food articles. For this purpose, pan 4 is formed with an upstanding rim 14 around its periphery.

Figure 7:
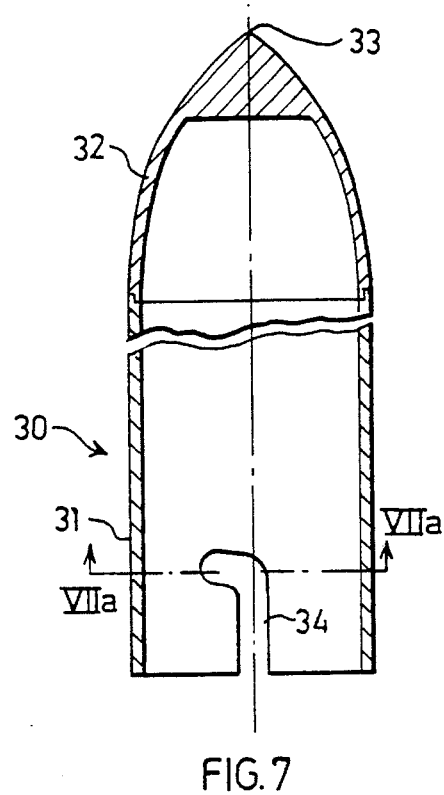
FIG. 7 is a longitudinal sectional view illustrating the vertical impaling member.
Figure 8:
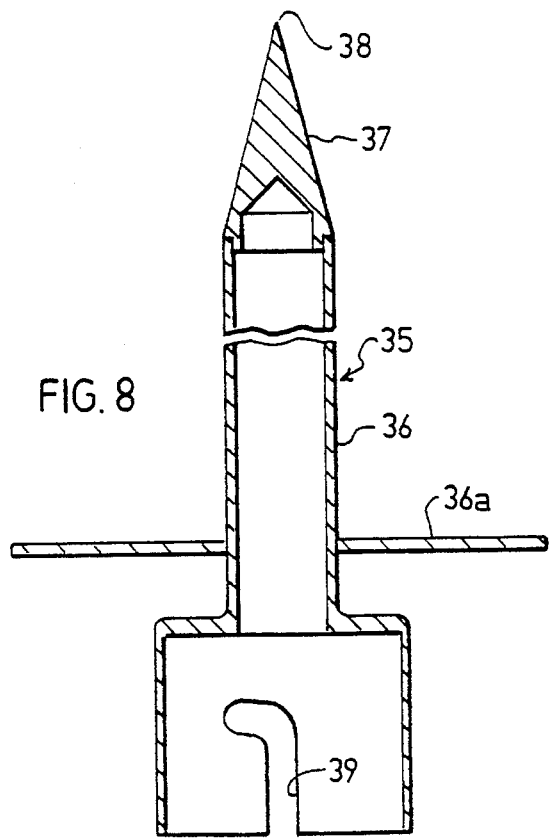
FIG. 8 is a longitudinal sectional view illustrating another type of vertical impaling member which may be used.
Figure 7A:
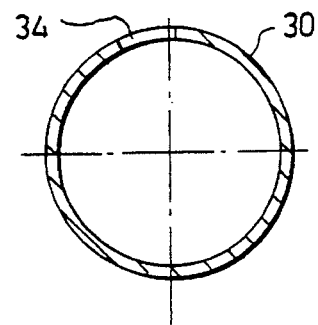
FIG. 7a is a transverse sectional view along line VIIa—VIIa of FIG. 7.

Pan 4 is coupled by the inner pin 11 on hub 10 to a vertical sleeve 15 within base 3. Sleeve 15 is rotated by a drive including a motor 16, a bevel gear 17 driven by the motor, and a gear 18 fixed to the sleeve. The outer pin 12 on hub 10 is used for removably attaching any one of a number of accessories to the hub by means of a bayonet-type slot, as shown in FIGS. 7 and 8 an to be described more particularly below. The inner pin 11 on hub 10 may be used in a similar manner for removably attaching the pan to rotary sleeve 15 of base 3, and sleeve 15 may therefore also be formed with a similar bayonet-type slot as illustrated in FIGS. 7 and 8 cooperable with pin 11.

Electrical heater 5 is fixed to base 3 and passes through the central hub 10 of pan 4. This electrical heater includes two long parallel legs 5a, 5b, joined at one of their ends by a U-bend 5c. The opposite ends of legs 5a, 5b carry a pair of pin-type electrical connectors 5d, 5e adapted to be received in sockets fixed to base 3 within its rotary sleeve 15.

Electrical heaters 6 and 7 are fixed to the base laterally of pan 4. Heater 6 is formed with two parallel legs 6a, 6b, joined together at one end by a U-bend 6c. Leg 6a is straight, but leg 6b is formed with a plurality of lateral U-bends. The two legs 6a, 6b terminate in pin connectors 6f, 6g.

Electrical heater 7 is similarly formed with a pair of parallel legs 7a, 7b joined together at one end by a U-bend 7c. Leg 7b includes a single U-bend 7d. The free ends of the two legs 7a, 7b carry pin-type connectors 7e, 7f receivable within sockets 22a, 22b of the base unit 3, with U-bend 7c nested between the U-bends 6c and 6d of electrical heater 6, and the U-bend 7d nested between U-bends 6d and 6e of electrical heater 6. The two electrical heaters 6 and 7 thus define a substantially rectangular heating area laterally, and conforming, to the curvature of the outer periphery of pan 4.

FIG. 7 illustrates one of the accessories, generally designated 30, adapted to be removably coupled to the central hub 10 of the horizontal pan 4. Accessory 30 is in the form of a vertical impaling member of thermally-conductive material mounted to central hub 4 for impaling food articles, particularly chicken, to be grilled within the grilling compartment. Thus, accessory 30 includes a hollow cylindrical sheath 31 enclosing electrical heater 5 and having a head 32 at its upper end curved to a pointed tip 33. The lower end of the cylindrical sheath 31 is formed with a bayonet-type slot 34 for removably attaching it to the outer pin 12 of the vertical hub 10 in the horiozntal pan 4.

Accessory 30 is used for grilling regular-size chicken, as will be described more particularly below with respect to FIG. 12a. For grilling Cornish chicken, roast beef, rulada, and similar food articles, the smaller-size accessory 35 illustrated in FIG. 8 may be used. Accessory 35 is also an impaling member which includes a cylindrical sheath 36 (but of smaller diameter than sheath 31 in FIG. 7), a tapered head 37 terminating at one end in a pointed tip 38, and a bayonet-type slot 39 at the opposite end for attachment to vertical hub 10 of pan 4 via its outer pin 12. The cylindrical sheath 36 is preferably integrally formed with a circular plate 36a to limit the position of the food article when applied to the sheath.

FIGS. 9 and 9a illustrate a sword-type accessory, generally designated 40, which may be attached to the vertical hub 10 of pan 4. Whereas accessories 30 and 35 illustrated in FIGS. 7 and 8, respectively, are used with the central electrical heater 5, accessory 40 illustrated in FIGS. 9 and 9a is not used with that electrical heater, and therefore that electrical heater is removed before this accessory is applied.

Thus, accessory 40 is in the form of a sword-type impaling member which includes a flat, solid blade 41 tapered at one end to a point 42, and carrying at its opposite end a cylindrical socket 43 formed with a slot 44 for attachment to pin 12 of the pan hub 10. The attachment of socket 43 to the blade 41 is reinforced by reinforcing plates 45. A circular plate 46 is attached to blade 41 to limit the position of the food articles applied to it. Accessory 40 is used particularly for grilling shwarma.

FIGS. 10 and 10a illustrate an accessory for grilling shishlik, kebab, hot dogs, etc. It is in the form of a skewer rod pointed at one end 51, and formed with an enlarged handle 52 at the opposite end for reception into one of the tubular sockets 13 of the pan 4. The diameter of its handle 52 is slightly smaller than the inner diameter of the sockets 13 so that each socket supports its respective skewer rod 50 in a vertical position, but permits the rod to rotate about its vertical axis. For this purpose, each handle 52 of the skewer rod 50 includes four radially-extending projections or fingers 53 equally spaced around the circumference of the rod. These projections are engageable with a fixed projection 54 (FIG. 2) carried by the housing 2. The arrangement is such that the housing projection 54 engages the rod projections 53 during the rotation of pan 4 to impart a partial (90°) rotation of the rod in its vertical socket 13 during each complete rotation of the pan.

It will be appreciated that a plurality of skewer rods 50 would be supplied such that one could be inserted into each of the vertical sockets 13 formed around the outer periphery of pan 4. Each rod includes a circular disc 55 limiting the position of the food articles on the rod.

Figure 11:
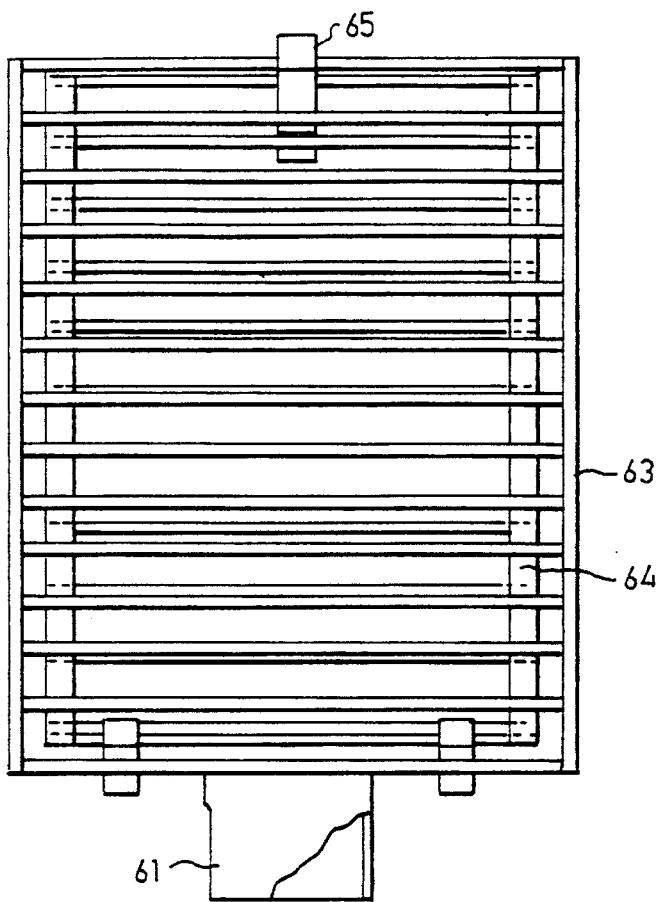
FIG. 11 is a front view of a flat-type food holder which may be included among the accessories.
Figure 11A:
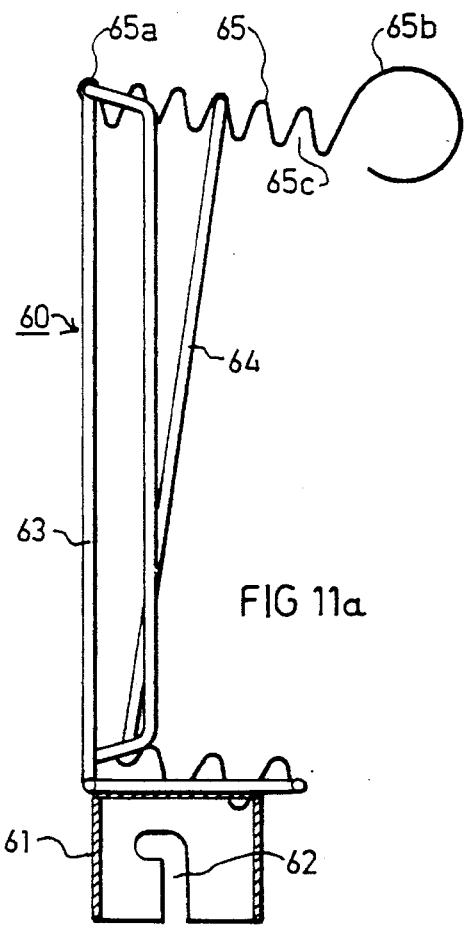
FIGS. 11a and 11b are side and top plan views, respectively, of the flat food holder of FIG. 11.
Figure 11B:
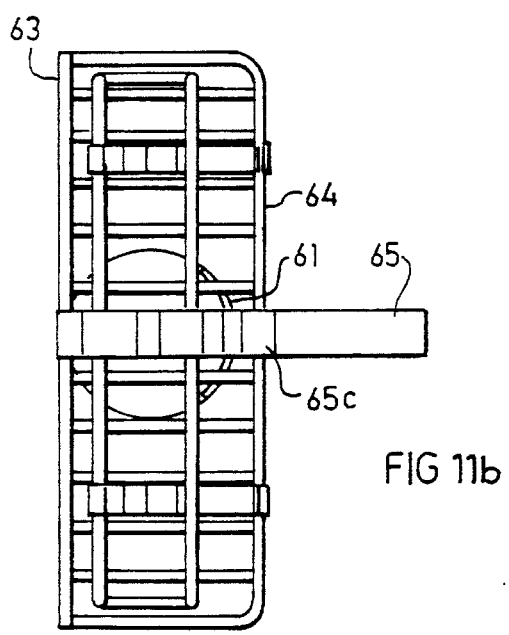

FIGS. 11, 11a and 11b illustrate a further accessory, a flat food holder 60, that may be applied to the vertical hub 10 of pan 4 for grilling flat type food articles, such as steaks, hamburgers, and the like. This accessory would also be used without the central heater 5 so that the grilling would be effected only by the two lateral heaters 6 and 7. Accessory 60 includes a cylindrical socket 61 at its lower end formed with a bayonet slot 62 for attachment to the outer pin 12 of the pan hub 10. The upper end of accessory 60 includes a wire section 63 fixed to socket 61, and a pivotal wire section 64 hingedly mounted at its lower end to section 63 and releasably retained in a selected pivoted position by a retainer element 65 at the upper end of the two sections. Thus, retainer element 65 is fixed at one end 65a to the fixed holder section 63, and terminates at its opposite end in a fingerpiece 65b. Between its two ends, it is formed with a plurality of bends 65c adapted to selectively receive the upper end of the pivotal holder section 64 in any one of a plurality of pivotal positions, depending on the thickness of the food article held between the two sections 63, 64 of the holder.

As shown particularly in FIG. 2, housing 2 is made of a plurality of sidewall sections 71, 72, 73, all detachable from the base 3 to enable the housing to be easily cleaned, as by insertion into a dish washer. All three sidewall sections 71–73 may be made of aluminum sheet or stainless steel, except that section 73 includes a transparent window 74. Thus, sidewall section 71 carries a pair of pin connectors 71a at its lower end receivable within sockets 71b in base 3; and similarly sidewall section 72 carries a pair of pin connectors 72a receivable within sockets 72b in base 3. Sidewall section 73, however, does not include pin connectors, but rather is pivotally mounted by hinges 75 to an edge of sidewall section 72, so that section 73 serves as a door which may be pivoted to open or closed positions to provide access into the interior of the grilling compartment.

The hinged section 73 includes the window 74. It also includes the top wall 76 of the housing. Top wall 76 is provided with a vent opening 77 (FIG. 1) whose cross-sectional area may be varied by rotating a knob 78. Hinged section 73 further includes a retainer member 79a engageable with a retainer member 79b carried by the respective edge of section 71, to releasably retain section 73 in its closed position.

The base unit is provided with the electrical controls. These controls include (FIG. 1) an ON/OFF switch 81, a presettable timer 82, a push button 83 for energizing the central electrical heater 5 when used, and another push button 84 for energizing the two lateral electrical heaters 6, 7 when used.

FIGS. 12a–12e illustrate different ways in which the illustrated appliance may be used with the various described accessories for grilling different kinds of food articles.

Figure 12A:
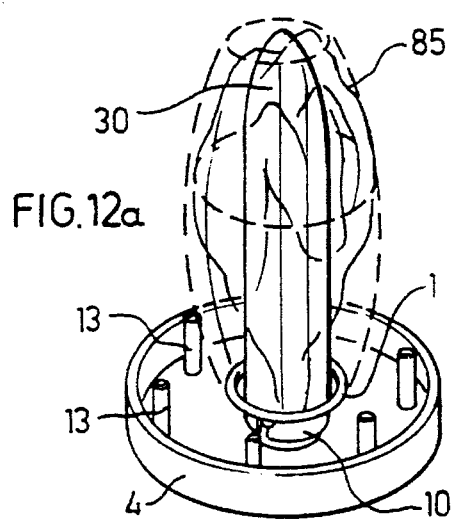
FIGS. 12a–12e illustrate how the grilling appliance may be used with the illustrated accessories for grilling various kinds of food articles.

FIG. 12a illustrates the use of the appliance for grilling chicken. When so used, the vertical impaling member 30 illustrated in FIG. 7 is applied to the central hub 10 of the horizontal pan 4 to enclose the central heater 5. The chicken to be grilled is impaled on this member such that the central heater 5 heats the interior of the chicken while the lateral heaters 6 and 7 heat the exterior of the chicken as it is rotated with pan 4. If desired, a springy wire cage 85 may be applied over the chicken being grilled to ensure good thermal contact of the chicken with the vertical impaling member 30, and also to facilitate the loading and unloading.

Figure 12B:
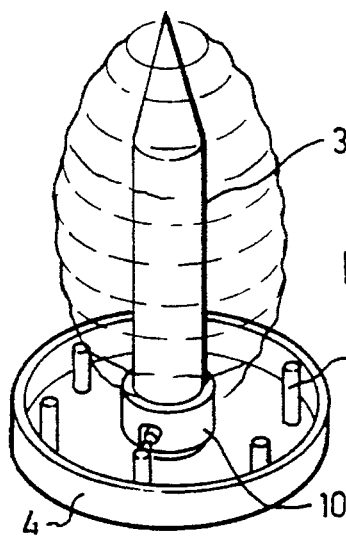

FIG. 12b illustrates the smaller vertical impaling member 35 (FIG. 8) applied to the central hub 10 of pan 4 for grilling such food articles as Cornish chicken, roast beef, rulada, and the like. In this application also, both the central heater, and the lateral heaters 6 and 7, are used for grilling the food article.

Figure 12C:
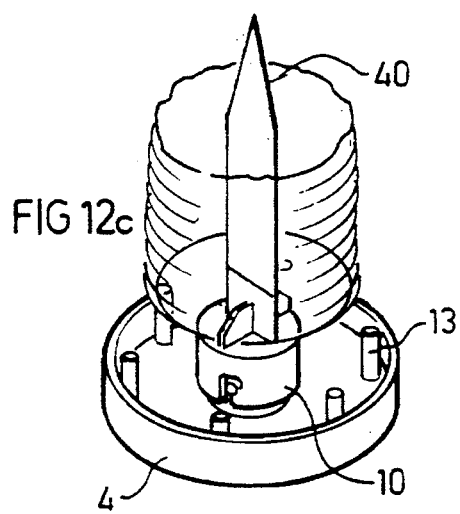

FIG. 12c illustrates the sword-type impaling member 40 applied to the central hub 10 of pan 4 for grilling such food articles as shwarma. In this case, the central heater 5 is first removed before the sword-type member 40 is applied, so that only the two lateral heaters 6, 7 are used for grilling the food articles as the horizontal pan 4 is rotated.

Figure 12D:
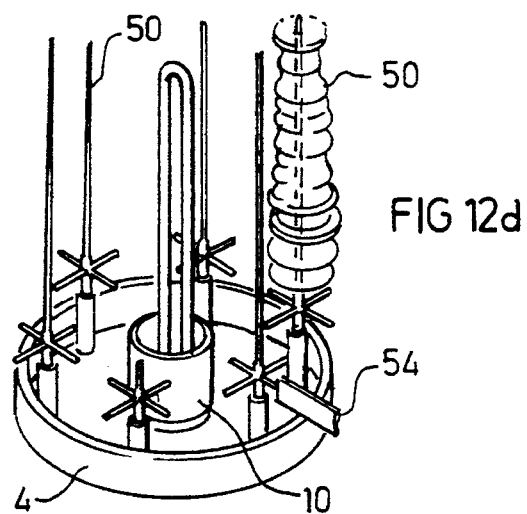

FIG. 12d illustrates the use of the skewer rods 50 for grilling food articles commonly grilled on skewer rods, such as shisklik, kebab, hot dogs, churisos, and the like. In this case, the central heater 5 is retained, but none of the above-accessories is applied to the pan hub 10 so that the central heater is directly exposed to the food articles on the skewer rods 50. The lateral heaters 6, 7 are also used. Thus, the food articles to be grilled are loaded onto the rods 50, and the rods are then mounted in the illustrated vertical position by inserting their handles 52 into the vertical sockets 13 of the horizontal pan 4. As the pan is rotated by the motor drive within base 3, the food articles are grilled from their opposite sides by electrical heater 5 on one side, and the two lateral heaters 6, 7, on the opposite side. In addition, as the pan is rotated, projection 54 fixed to the housing 2 sequentially engages the projections 53 of the skewer rods 50, to impart a partial (90°) rotation to each skewer rod for each complete (360°) rotation of the pan.

Figure 12E:
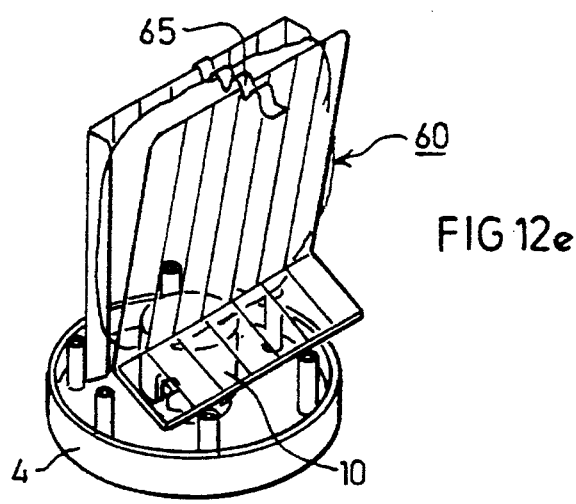

FIG. 12e illustrates the flat food holder 60 applied to the central hub 10 of the rotating pan 4 for grilling flat types of food articles, such as steaks, hamburgers, and the like. In this case also, the central heater 5 is removed and only the lateral heaters 6, 7 are used. The food articles to be grilled are inserted between the two sections 63, 64 of the food holder 60. The hinged section 64 is retained in position by retainer member 65 according to the thickness of the food articles to be grilled.

As one example, the impaling members 30, 35, 40, and the horizontal pan 4, may all be made of aluminum, preferably coated or lined with a non-stick layer, such as "Teflon" (Reg.T.M.) to facilitate cleaning. The central heater 5 may be of 350 watts adjustable down to 200 watts; heater 6 may be of 950 watts; and heater 7 may be of 430 watts. The rotatable drive may have a rotary speed of 0.5 rpm, continuous or in stepped increments of 10° or less. The drive may also be selectively controllable to introduce a dwell period of about 60 seconds for each 180° of rotation, which is particularly useful when grilling flat food articles with the flat food holder 60 illustrated in FIG. 11.

Figure 13:
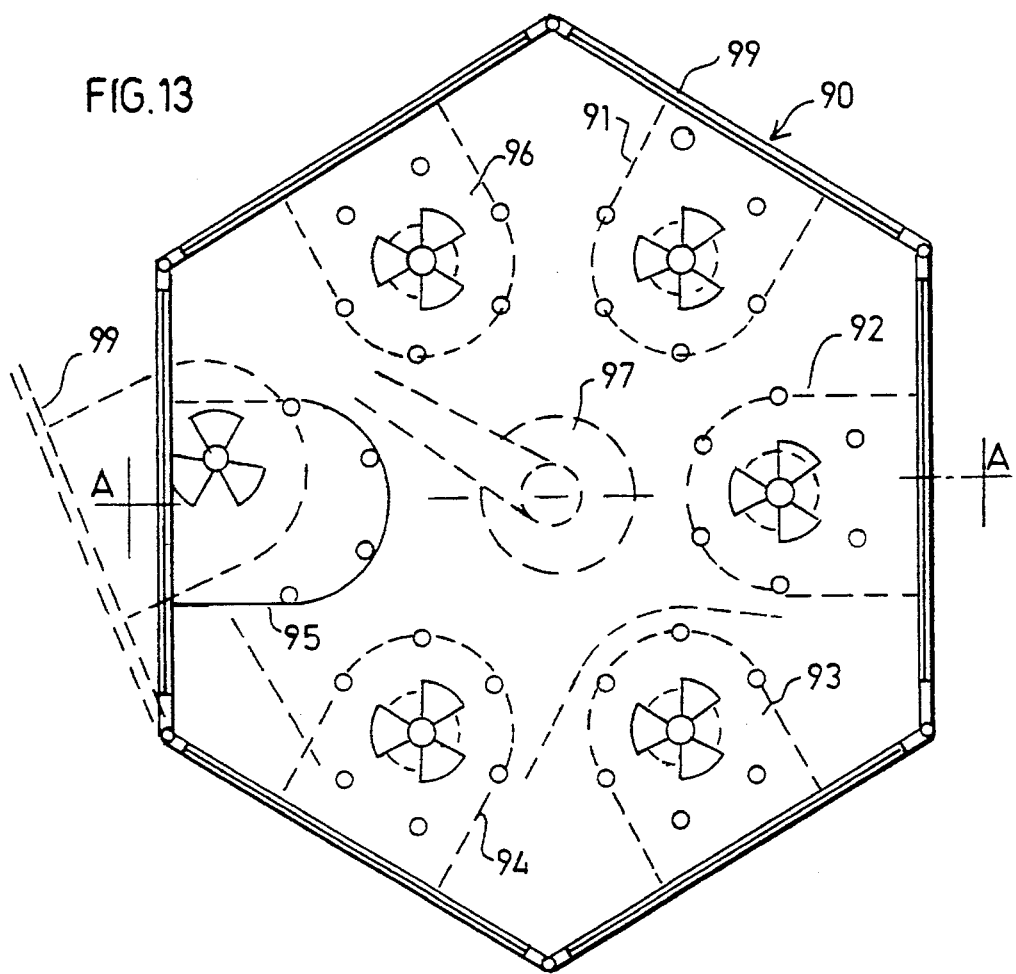
FIG. 13 is a top plan view diagrammatically illustrating a grilling appliance constructed in accordance with the invention for institutional use to grill a plurality of food articles at one time.
Figure 14:
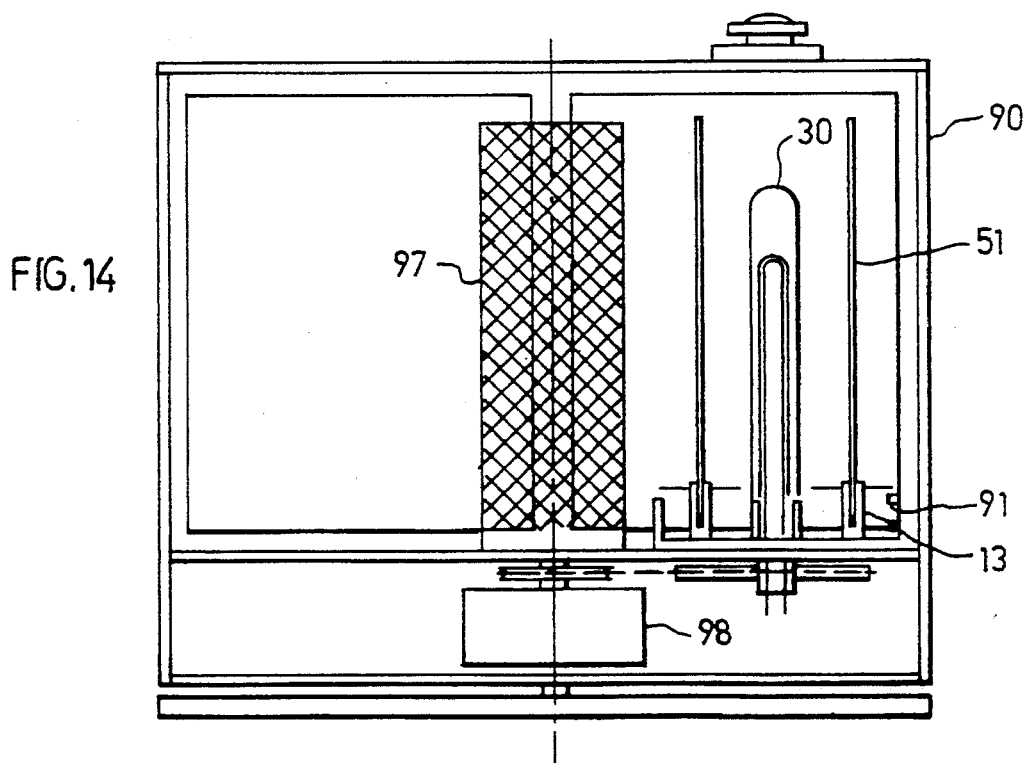
FIG. 14 is a side elevational view diagrammatically illustrating the grilling appliance of FIG. 13.

The invention may also be incorporated in an institutional grilling appliance, such as for a restaurant, hotel or the like, in order to grill a plurality of food articles at the same time. FIGS. 13 and 14 schematically illustrate such an institutional appliance. It includes a common housing 90 having six sides each accommodating one of six rotatable horizontal pans 91–96, each of similar construction as horizontal pan 4 in the above-described embodiment. Thus, each of the horizontal rotating pans 91–95 in FIGS. 13 and 14 also includes a central vertical hub 10 for selectively receiving one of the accessories described above, and also for accommodating the central heating element 5. However, instead of having lateral heaters corresponding to heaters 6 and 7, for each of the rotating pans, a common heater 97 is provided centrally of the housing for supplying the lateral heat to the food articles being grilled on all the rotating pans 91–96. The common heater 97 may be a powerful electrical heater, or a gas heater.

All the pans 91–96 are driven by a common drive 98, as shown in FIG. 14. Housing 90 may have individually openable doors 99 in each of its six sides, to permit independent access to the food articles being grilled on each of the rotating pans 91–96.

In all other respects, the institutional appliance illustrated in FIGS. 13 and 14 may be constructed and used in substantially the same manner as described above with respect to the appliance of FIGS. 1–11.

While the invention has been described with respect to two preferred embodiments, it will be appreciated that these are set forth merely for purposes of example, and that many other variations, modifications and applications of the invention may be made.

We claim:

1. A grilling appliance, comprising:
   a housing defining a grilling compartment for receiving food articles to be grilled;
   a vertical impaling member of thermally-conductive material mounted vertically within said grilling compartment for impaling a food article to be grilled;
   a rotary drive for rotating said vertical impaling member about a vertical axis;
   a first heater located within said vertical impaling member for heating the interior of the food article to be grilled;
   and a second heater located laterally of said vertical impaling member for heating the exterior of the food article to be grilled.

2. The appliance according to claim 1, wherein said vertical impaling member is mounted centrally over a horizontal pan which catches drippings from the food article as it is being grilled.

3. The appliance according to claim 2, wherein said rotary drive is enclosed within a base underlying said grilling compartment, and said pan is rotatably supported on said base.

4. The appliance according to claim 3, wherein said first heater is an electrical heater fixed to said base and passing through the center of said pan; and said second heater is also an electrical heater and is fixed to said base laterally of said pan.

5. The appliance according to claim 4, wherein said pan is formed with a central vertical hub accommodating said first heater and having a connector for removably attaching said vertical impaling member thereto.

6. The appliance according to claim 5, wherein said electrical heaters have electrical connectors at their lower ends removably received within electrical sockets in said base to removably mount said electrical heaters in a vertical position on said base.

7. The appliance according to claim 5, wherein said appliance includes a number of accessories attachable to said central vertical hub of the pan in place of said vertical impaling member.

8. The appliance according to claim 7, wherein said accessories include a sword-type impaling member for attachment in a vertical position to said central vertical hub in place of said vertical impaling member and said first heater.

9. The appliance according to claim 7, wherein said accessories include a flat food holder for attachment in a vertical position to said central vertical hub in place of said vertical impaling member and said first heater.

10. The appliance according to claim 7, wherein each of said accessories includes a bayonet-pin and socket connector element for quick attachment to and detachment from a mating connector element on said central vertical hub.

11. The appliance according to claim 3, wherein said pan is formed with at least one vertical socket adjacent to its periphery for receiving a vertical skewer rod.

12. The appliance according to claim 11, wherein said pan is formed with a plurality of said vertical sockets adjacent to and around its periphery for receiving a plurality of said vertical skewer rods.

13. The appliance according to claim 12, wherein each of said vertical skewer rods is rotatably received within its respective socket and includes a plurality of projections around its periphery engageable with a projection fixed to said housing for imparting a partial rotation of each vertical skewer rod in its socket during each complete rotation of said pan.

14. The appliance according to claim 3, wherein said housing includes side walls carrying pins at their lower ends receivable within sockets in said base for removably attaching said housing side walls to said base.

15. A grilling appliance, comprising:
   a housing defining a grilling compartment for receiving food articles to be grilled;
   an electrical heater within said grilling compartment for heating food articles therein;
   and a base underlying said grilling compartment for supplying electrical power to said heater;
   said housing including side walls carrying pins at their lower ends receivable within sockets in said base for removably attaching said side walls to said base.

16. The appliance according to claim 15, wherein said base includes an electrical socket for removably receiving an electrical connector carried by said electrical heater.

17. The appliance according to claim 14, wherein said housing side walls includes a first section carrying said pins for removably attaching same to the base, and a second section devoid of pins and hingedly attached to said first section for pivotal movement to either an open position or a closed position with respect to said grilling compartment.

18. The appliance according to claim 17, wherein said hinged section of the housing side walls is formed with a top wall for closing the upper end of the grilling compartment when said hinged section is in a closed position.

19. The appliance according to claim 18, wherein said top wall is formed with an adjustable vapor vent.

20. The appliance according to claim 16, wherein said housing side walls include at least one further section carrying pins for removably attaching same to the base.

21. The appliance according to claim 1, wherein said housing defining said grilling compartment includes a plurality of said vertical impaling members at spaced locations in the grilling compartment, each enclosing a said first heater.

22. The appliance according to claim 20, wherein said grilling compartment includes a said second heater laterally of and common to a plurality of said vertical impaling members.

23. A grilling appliance, comprising:
   a housing defining a grilling compartment for receiving food articles to be grilled;
   a vertical impaling member of thermally-conductive material mounted vertically within said grilling compartment for impaling a food article to be grilled;
   a heater located within said vertical impaling element for heating the interior of the food article to be grilled;
   another heater within said grilling compartment for heating food articles therein;
   a horizontal pan within said grilling compartment and formed with at least one vertical socket;
   a rotary drive for rotating said vertical impaling member and said horizontal pan about a vertical axis;
   a vertical skewer rod rotatably received within said vertical socket for impaling other food articles to be grilled and including a plurality of projections around its periphery;
   and a projection carried by said housing and engageable with said projections on the vertical skewer rod for rotating the vertical skewer rod in its socket a partial rotation during each complete rotation of the horizontal pan.

24. The grilling appliance according to claim 23, wherein said pan is formed with a plurality of said vertical sockets adjacent to and around its periphery, and there are a plurality of said vertical skewer rods each rotatably received within one of said vertical sockets.

* * * * *